(12) United States Patent
Tabota

(10) Patent No.: US 6,766,690 B2
(45) Date of Patent: Jul. 27, 2004

(54) ACCELERATION SENSOR

(75) Inventor: Jun Tabota, Toyama-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/442,154

(22) Filed: May 21, 2003

(65) Prior Publication Data
US 2003/0217598 A1 Nov. 27, 2003

(30) Foreign Application Priority Data
May 21, 2002 (JP) ........................................ 2002-146096

(51) Int. Cl.[7] .............................................. G01P 15/09
(52) U.S. Cl. ................................................... 73/514.34
(58) Field of Search ........................ 73/514.34, 514.33, 73/514.16, 514.29; 310/329, 331, 311; 29/25.35

(56) References Cited

U.S. PATENT DOCUMENTS 6,588,276 B2 * 7/2003 Yamashita ............... 73/514.34
6,615,465 B2 * 9/2003 Otsuchi et al. ............ 29/25.35
6,619,124 B2 * 9/2003 Ogiura .................... 73/514.34

FOREIGN PATENT DOCUMENTS

JP          09-026433     1/1997
JP          10-062445     3/1998

* cited by examiner

Primary Examiner—Helen Kwok
(74) Attorney, Agent, or Firm—Keating & Bennett, LLP

(57) ABSTRACT

An acceleration sensor includes a sensing element and a pair of supporting members for supporting the sensing element at one end in the longitudinal direction thereof. The sensing element includes four laminated piezoelectric layers, and electrodes are provided at the center in the thickness direction of the sensing element, between a pair of first layers and a pair of second layers, and on the outer surfaces of the pair of second layers. Cells formed by the first and second layers at each side of the center in the thickness direction are electrically connected in parallel. The pair of first layers preferably have substantially the same thickness and the pair of second layers preferably have substantially the same thickness, and the ratio of the thickness $T_1$ of each first layer to the total thickness $T_2$ of each first and second layer is about 62% to about 76%.

18 Claims, 13 Drawing Sheets

>—< COMPRESSIVE STRESS
←→ TENSILE STRESS

| SECOND LAYER | FIRST LAYER | RATIO OF FIRST LAYER | VOLTAGE SENSITIVITY | CHARGE SENSITIVITY | GENERATED ENERGY | INCREASE IN ENERGY |
|---|---|---|---|---|---|---|
| $\mu m$ | $\mu m$ | % | mV/G | pC/G | $10^{-18}$J/G | % |
| 105 | 105 | 50.0 | 1.53 | 0.666 | 511 | 0 |
| 90 | 120 | 57.1 | 1.60 | 0.714 | 570 | 12 |
| 80 | 130 | 61.9 | 1.60 | 0.747 | 597 | 17 |
| 70 | 140 | 66.7 | 1.57 | 0.779 | 613 | 20 |
| 60 | 150 | 71.4 | 1.51 | 0.811 | 612 | 20 |
| 50 | 160 | 76.2 | 1.41 | 0.842 | 592 | 16 |
| 30 | 180 | 85.7 | 1.06 | 0.909 | 483 | -5 |

| LENGTH OF ELECTRODE | LENGTH OF ELECTRODE GAP | RATIO OF ELECTRODE GAP | VOLTAGE SENSITIVITY | CHARGE SENSITIVITY | GENERATED ENERGY | INCREASE IN ENERGY |
|---|---|---|---|---|---|---|
| mm | mm | % | mV/G | pC/G | $10^{-18}$ J/G | % |
| 0.7 | 2.3 | 76.7 | 1.95 | 0.476 | 463 | 10 |
| 0.9 | 2.1 | 70.0 | 1.88 | 0.576 | 540 | 28 |
| 1.1 | 1.9 | 63.3 | 1.78 | 0.658 | 586 | 39 |
| 1.3 | 1.7 | 56.7 | 1.68 | 0.726 | 609 | 44 |
| 1.5 | 1.5 | 50.0 | 1.57 | 0.779 | 613 | 45 |
| 1.7 | 1.3 | 43.3 | 1.47 | 0.820 | 602 | 42 |
| 1.9 | 1.1 | 36.7 | 1.37 | 0.850 | 582 | 38 |
| 2.3 | 0.7 | 23.3 | 1.19 | 0.884 | 524 | 24 |
| 2.6 | 0.3 | 10.3 | 1.03 | 0.896 | 460 | 9 |
| 3.0 | 0.0 | 0.0 | 0.94 | 0.897 | 423 | 0 |

| LENGTH OF ELECTRODE | LENGTH OF ELECTRODE GAP | RATIO OF ELECTRODE GAP | VOLTAGE SENSITIVITY | CHARGE SENSITIVITY | GENERATED ENERGY | INCREASE IN ENERGY |
|---|---|---|---|---|---|---|
| mm | mm | % | mV/G | pC/G | $10^{-18}$ J /G | % |
| 3 | 0 | 0.0 | 1.80 | 0.378 | 340 | 0 |
| 2.4 | 0.6 | 20.0 | 2.17 | 0.375 | 407 | 20 |
| 2.1 | 0.9 | 30.0 | 2.41 | 0.368 | 443 | 30 |
| 1.7 | 1.3 | 43.3 | 2.76 | 0.346 | 479 | 41 |
| 1.5 | 1.5 | 50.0 | 2.95 | 0.329 | 486 | 43 |
| 1.2 | 1.8 | 60.0 | 3.22 | 0.294 | 473 | 39 |
| 0.9 | 2.1 | 70.0 | 3.45 | 0.245 | 422 | 24 |

ACCELERATION SENSOR

BACKGROUND OF THE INVENTION

1. Field of the Invention

The present invention relates to an acceleration sensor using piezoelectric ceramic material.

2. Description of the Related Art

Various types of acceleration sensors using piezoelectric ceramic material have been proposed. Generally, in acceleration sensors, two types of sensitivities are used: voltage sensitivity and charge sensitivity. By increasing the charge sensitivity, the S/N ratio can be increased with respect to electromagnetic noise caused by external apparatuses and the circuit which affects the junction between the acceleration sensor and an amplifier, which is connected to the subsequent stage. On the other hand, by increasing the voltage sensitivity, the S/N ratio can be increased with respect to the voltage noise caused by the amplifier itself. Therefore, in order to increase the S/N ratio with respect to both external electromagnetic noise and noise inside the amplifier, both charge sensitivity and voltage sensitivity must be increased. That is, in a high S/N or highly sensitive sensor, a large amount of energy is generated, the energy being represented as ½ of the product of charge sensitivity and voltage sensitivity.

Japanese Unexamined Patent Application Publication No. 10-62445 discloses an acceleration sensor including three or more laminated piezoelectric ceramic layers, each layer having substantially the same thickness, and the layers being electrically connected in parallel. In this acceleration sensor, charge sensitivity can be increased by increasing the number of layers. In this acceleration sensor, however, by increasing the number of layers while the entire thickness of a sensing element is kept the same, the thickness of each layer is reduced and capacitance increases. Thus, the voltage sensitivity at each layer decreases accordingly. Also, the potential at an inner layer is lower than that at an outer layer. Therefore, by connecting these layers in parallel, the voltage sensitivity of the entire sensing element is the average of the voltage of each layer, and the entire voltage sensitivity is decreased as the number of laminated layers is increased. As a result, generated energy does not significantly increase.

Table 1 shows the sensitivity of two types of acceleration sensors: a two-layered type and a four-layered type. Herein, each acceleration sensor has a one-end-supported structure, the thickness of the entire sensing element is 0.42 mm, the free length except a supporting portion is 3.0 mm, and the width of the sensing element is 0.4 mm. As can be seen, the four-layered sensor has much higher charge sensitivity than that of the two-layered sensor, but voltage sensitivity is low, and thus the amount of generated energy in both sensors is the same. This table shows the characteristic in a state where each layer is electrically connected in parallel to each other, although the state is not shown in a figure.

TABLE 1

| Characteristic | Two-layered | Four-layered |
| --- | --- | --- |
| Voltage sensitivity (mV/G) | 3.45 | 1.00 |
| Charge sensitivity (pC/G) | 0.245 | 0.841 |
| Capacitance (pF) | 70.9 | 837 |
| Energy ($10^{-18}$ J/G) | 422 | 422 |

In the above-shown characteristic, the entire thickness and free length of the sensing element are the same in the two-types of sensors, in order to compare the two sensors. In the characteristic of the shape including the thickness and free length, the following equations are satisfied:

charge sensitivity $Q = kd \cdot WL^3/L$; and voltage sensitivity $V = kg \cdot L^2$.

If this shape is changed, the characteristic is also changed. Herein, L represents free length; W represents the width of the sensing element; T represents the entire thickness of the sensing element; g and d represent a piezoelectric constant; and k represents another coefficient. According to the above equations, the free length L should be increased in order to increase charge sensitivity and voltage sensitivity. Also, if the thickness T is decreased, the charge sensitivity increases and the voltage sensitivity is not changed, and thus, generated energy increases. However, the size increases by increasing L, and strength decreases by decreasing T. In this case, resonance frequency at a detecting portion decreases so that the acceleration at high frequency cannot be precisely measured. Thus, the size is limited.

Japanese Unexamined Patent Application Publication No. 9-26433 discloses a two-layered acceleration sensor having a one-end-supported structure. In this acceleration sensor, an intermediate electrode and a surface electrode are formed over the entire length thereof. When acceleration is applied to the sensor, stress is generated due to the acceleration and also a charge is generated so that an output signal is generated. In a one-end-supported structure, the stress is large at the vicinity of the supported portion of the sensing element and becomes smaller toward the free end thereof. In this state, the free end does not contribute so much to generation of a charge, and this state is equivalent to a state where only capacitance components are electrically connected in parallel. Therefore, voltage sensitivity of the entire sensing element is the average along the entire length. Also, the entire voltage sensitivity decreases compared to a case where an electrode is provided only near the supported portion, and thus, generated energy cannot be increased.

SUMMARY OF THE INVENTION

In order to overcome the problems described above, preferred embodiments of the present invention provide a highly sensitive acceleration sensor in which generated energy can be significantly increased without changing the free length and thickness thereof.

According to a first preferred embodiment of the present invention, an acceleration sensor includes a sensing element, and a pair of supporting members for supporting the sensing element at one end, both ends, or a central portion in the longitudinal direction thereof. The sensing element includes at least four laminated piezoelectric layers, each layer including a piezoelectric ceramic material. The four piezoelectric layers include a pair of first layers positioned at the center in the thickness direction and a pair of second layers sandwiching the pair of first layers. Electrodes are provided at the center in the thickness direction of the sensing element, between the pair of first layers and the pair of second layers, and on the outer surfaces of the pair of second layers. Cells formed by the first and second layers located on the same side with respect to the center in the thickness direction are electrically connected in parallel. The pair of first layers preferably have substantially the same thickness and the pair of second layers preferably have substantially the same thickness. The ratio of the thickness of each first layer to the total thickness of each first and second layer is about 62% to about 76%.

According to a second preferred embodiment of the present invention, an acceleration sensor includes a sensing element, and a pair of supporting members for supporting the sensing element at one end, both ends, or a central portion in the longitudinal direction thereof. The sensing element includes six laminated piezoelectric layers, each layer including a piezoelectric ceramic material. The six piezoelectric layers include a pair of first layers positioned at the center in the thickness direction, a pair of second layers sandwiching the pair of first layers, and a pair of third layers positioned on the outer side. Electrodes are provided at the center in the thickness direction of the sensing element, between the pair of first layers and the pair of second layers, between the pair of second layers and the pair of third layers, and on the outer surfaces of the pair of third layers. Cells formed by the first, second, and third layers located on the same side with respect to the center in the thickness direction are electrically connected in parallel. The pair of first layers preferably have substantially the same thickness, the pair of second layers preferably have substantially the same thickness, and the pair of third layers preferably have substantially the same thickness. The ratio of the thickness of each first layer to the total thickness of each first, second, and third layer is about 51% to about 62%. The ratio of the total thickness of each first and second layer to the total thickness of each first, second, and third layer is about 72% to about 87%.

According to a third preferred embodiment of the present invention, an acceleration sensor including a sensing element, and a pair of supporting members for supporting the sensing element at one end in the longitudinal direction thereof. The sensing element includes two or more laminated piezoelectric layers, each layer including a piezoelectric ceramic material. Electrodes are provided between the piezoelectric layers and on the outer surfaces of the piezoelectric layers. An electrode gap is provided in the free-end side of the sensing element, the electrode gap being a region where at least one of electrodes facing with the piezoelectric layers therebetween is not located. The ratio of the length of the electrode gap to the free length of the sensing element is about 20% to about 70%.

In the acceleration sensor according to preferred embodiments of the present invention, the sensing element preferably includes four laminated piezoelectric layers including a piezoelectric ceramic material, and the thickness of each first layer is larger than that of each second layer. More specifically, the ratio of the thickness of each first layer to the total thickness of each first and second layer is about 62% to about 76%. When the thickness of each of the four layers is the same as in the known art, the potential of the inner layer is lower than that of the outer layer even if the charge sensitivity is increased by increasing the number of layers. Thus, the voltage sensitivity decreases by connecting the layers in parallel, and the amount of generated energy does not increase. On the other hand, when the inner layer is thicker than the outer layer so that the potential in both layers is almost equal to each other as in preferred embodiments of the present invention, the generated energy is significantly increased. In an example, when the ratio of the thickness of each first layer was about 70%, the generated energy increased about 20% compared to the case where the first and second layer have the same thickness. Further, when the ratio of the thickness of each first layer was about 62% to about 76%, generated energy increased about 16% or more.

In the acceleration sensor according to preferred embodiments of the present invention, each of the first and second piezoelectric layers may be formed by a ceramic sheet having a predetermined thickness. Alternatively, each of the piezoelectric layers may be formed by laminating one or more ceramic sheets, each sheet preferably having the same thickness. In this case, if the number of ceramic sheets included in each first layer is preferably twice the number of ceramic sheets included in each second layer, the ratio of the thickness of each first layer is about 70%, and thus, maximum energy can be obtained. In this case, since the sensing element can be formed by using ceramic sheets having the same thickness, the thickness can be easily adjusted and manufacturing cost can be reduced.

In the second preferred embodiment, the number of layers included in the sensing element is preferably six and the thickness of the layers is large at the inner side and small at the outer side, so that the potential generated in the three layers is almost equal. Accordingly, generated energy can be increased. Also, by setting the ratio of the thickness of each first layer to the total thickness of each first, second, and third layer to about 51% to about 62%, and setting the ratio of the total thickness of each first and second layer to about 72% to about 87%, generated energy can be significantly increased compared to the case where all the layers have the same thickness.

In the sensing element having a one-end-supported construction according to the third preferred embodiment, by providing electrodes at the vicinity of a bonded portion of the sensing element, in other words, by removing the electrode at the free-end side of the sensing element, the voltage sensitivity can be significantly increased. That is, when acceleration is applied to the sensing element having a one-end-supported construction, large output is generated only from the vicinity of the bonded portion of the sensing element. Thus, the electrode at the free-end side of the sensing element, which has few effects on the generation of charge, is not necessary. Therefore, charge can be obtained from the portion generating a large amount of charge, and increased energy can be generated. By increasing the area of the electrode gap, the area of the electrode becomes small and thus the charge sensitivity decreases. However, the effect of the free end portion having a low potential becomes small, and thus, the voltage sensitivity increases. As a result, generated energy reaches maximum when the ratio of the electrode gap is in a predetermined range. According to an example, maximum energy is generated when the ratio of the electrode gap to the free length of the sensing element is about 50%. In this case, the amount of generated energy is larger by about 45% compared to the case when the electrode gap is not provided. Also, about a 20% or more increase in the generated energy can be realized when the ratio of the electrode gap is about 20% to about 70%. In this case, a connecting electrode for connecting the electrodes, which extend to the free end of the sensing element, is preferably provided on a side surface in the free-end side of the sensing element provided with the electrode gap.

Also, features of the first and third preferred embodiments may be combined. In this case, increased energy is generated due to the difference in the thickness of the first and second layers, as well as to the electrode gap. Therefore, a highly sensitive acceleration sensor can be obtained by the synergistic effect.

Further, the electrodes between the pair of first layers and the pair of second layers, the electrode at the center in the thickness direction, and the electrodes on the outer surfaces of the pair of second layers may be extended to the outside. That is, one end of each of the electrodes between the pair of first layers and the pair of second layers is positioned at the end surface of the sensing element supported by the supporting members, and the other end of each of the electrodes is positioned at a predetermined distance from the free end of the sensing element so as to form the electrode gap. On the other hand, the electrode at the center in the thickness direction and the electrodes on the outer surfaces of the pair of second layers extend from the vicinity of a proximal end of the sensing element supported by the supporting members to the free end of the sensing element. Also, the electrode at the center in the thickness direction and the electrodes on the outer surfaces of the pair of second layers are connected through the connecting electrode provided on a side surface in the free-end side of the sensing element.

In this case, the electrode at the center in the thickness direction and the electrodes on the outer surfaces of the pair of second layers can be connected by forming the connecting electrode on a side surface of the sensing element. With this configuration, a reliable connection can be ensured. Also, since the connecting electrode is provided at the electrode gap, the connecting electrode is not electrically connected to the electrode between the pair of first layers and the pair of second layers. Further, since the connecting electrode may be provided on a side surface of the sensing element, a complicated process is not necessary unlike in the case where the connecting electrode is formed on the end surface of the sensing element.

Other features, elements, characteristics and advantages of the present invention will become more apparent from the following detailed description of preferred embodiments thereof with reference to the attached drawings.

BRIEF DESCRIPTION OF THE DRAWINGS

FIGS. 5A and 5B illustrate effects of generated energy according to the ratio of thickness, wherein FIG. 5A shows the configuration of a four-layered acceleration sensor and FIG. 5B is the circuit diagram thereof;

FIGS. 6A and 6B show the relationship between the ratio of a first layer and the sensitivity, wherein FIG. 6A shows the characteristics and FIG. 6B shows numerical data;

FIGS. 8A and 8B show the relationship between the ratio of the electrode gap and the sensitivity, wherein FIG. 8A shows the characteristics and FIG. 8B shows numerical data;

FIGS. 12A and 12B show the relationship between the ratio of the electrode gap and the sensitivity of the acceleration sensor shown in FIG. 11, wherein FIG. 12A shows the characteristics and FIG. 12 shows numerical data.

DETAILED DESCRIPTION OF PREFERRED EMBODIMENTS

Figure 1:
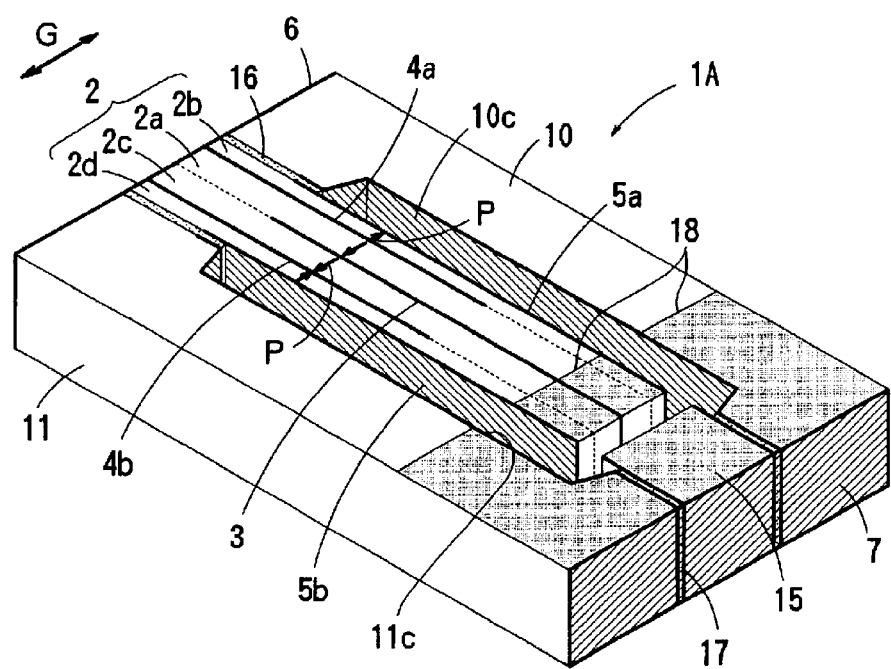
FIG. 1 is a perspective view of an acceleration sensor according to a first preferred embodiment of the present invention.

FIGS. 1 to 4 show an acceleration sensor 1A according to a first preferred embodiment of the present invention. The acceleration sensor 1A includes a sensing element 2. An end portion in the longitudinal direction of the sensing element 2 is bonded to and supported by a pair of supporting frames (supporting members) 10 and 11, each of the supporting frames having a substantially U-shaped cross-section. The supporting frames 10 and 11 include an insulating material, such as ceramic or resin. One end portion of the sensing element 2 is bonded and held between holding portions 10a and 11a of the supporting frames 10 and 11 via an anisotropic conductive adhesive 16. Also, an end member 15, which has a thickness that is substantially the same as that of the sensing element 2, is bonded and held between holding portions 10b and 11b via an anisotropic conductive adhesive 17. The acceleration sensor 1A can be efficiently manufactured by the following method. That is, a combination member including the sensing element 2 and the end member 15 is formed, both ends of the combination member are bonded to one of the supporting frames 10 and 11, the border portion between the sensing element 2 and the end member 15 is cut by using a dicer or other suitable device, and the other of the supporting frames 10 and 11 is bonded to the sensing element 2 and the end member 15. Spaces 13 and 14 are formed between the sensing element 2 and the supporting frames 10 and 11 so that the sensing element 2 can bend when acceleration G acts thereon.

The sensing element 2 of this preferred embodiment is made by laminating four piezoelectric layers 2a to 2d, each layer being thin strip-shaped and made of piezoelectric ceramic, and then by baking the laminated layers. In the sensing element 2, first layers 2a and 2c are laminated with the center in the thickness direction therebetween, and second layers 2b and 2d sandwich the first layers 2a and 2c. Further, a central electrode 3 is provided at the center in the thickness direction of the sensing element 2, interlayer electrodes 4a and 4b are provided between the first layer 2a and the second layer 2b and between the first layer 2c and the second layer 2d, respectively, and surface electrodes 5a and 5b are provided on the outer surfaces of the second layers 2b and 2d. The four piezoelectric layers 2a to 2d sandwiched by the electrodes 3, 4a, 4b, 5a, and 5b form four cells (1) to (4).

The first layers 2a and 2c preferably have the same thickness, and also the second layers 2b and 2d preferably have the same thickness. The ratio of a thickness $T_1$ of the first layer 2a (2c) to a total thickness $T_2$ of the first layer 2a (2c) and the second layer 2b (2d) is about 62% to about 76% That is, the expression: $0.62 \leq T_1/T_2 \leq 0.76$ is satisfied.

One end of each of the interlayer electrodes 4a and 4b, which are provided between the first layer 2a and the second layer 2b and between the first layer 2c and the second layer 2d, respectively, is extended to the end surface of the sensing element 2, which is supported by the supporting frames 10 and 11. Accordingly, the interlayer electrodes 4a and 4b are electrically connected to an external electrode 6 which is continuously formed on end surfaces of the supporting frames 10 and 11 and the sensing element 2. The other end of each of the interlayer electrodes 4a and 4b is positioned at a predetermined distance from the free end of the sensing element 2. An electrode-free portion extending from the free end of the sensing element 2 to the other end of each of the interlayer electrodes 4a and 4b is called an electrode gap. The ratio of the length of the electrode gap Lg to the free length Lf of the sensing element 2 (electrode gap ratio) is about 20% to about 70%. That is, the expression: $0.2 \leq Lg/Lf \leq 0.7$ is satisfied.

The above-described central electrode 3 and the surface electrodes 5a and 5b extend from the vicinity of the bonded portion of the sensing element 2 and the holding portions 10a and 11a to the free end of the sensing element 2. In particular, the surface electrodes 5a and 5b extend to the bonded portion of the sensing element 2 and the holding portions 10a and 11a of the supporting frames 10 and 11, that is, one end of each of the surface electrodes 5a and 5b is positioned at a predetermined distance from the end surface on which the external electrode 6 is located. Further, inner surface electrodes 10c and 11c are disposed on the inner surfaces of the supporting frames 10 and 11, and the inner-surface electrodes 10c and 11c extend from the holding portions 10a and 11a to the holding portions 10b and 11b. One end of each of the inner-surface electrodes 10c and 11c, which extend to the holding portions 10a and 11a, is positioned at a predetermined distance from the end surface on which the external electrode 6 is located, so that the inner-surface electrodes 10c and 11c are electrically connected to the surface electrodes 5a and 5b via the anisotropic conductive adhesive 16. The anisotropic conductive adhesive 16 does not have conductivity in the plane direction, but has conductivity only in the thickness direction. Therefore, the inner-surface electrodes 10c and 11c and the surface electrodes 5a and 5b are not in conduction with the external electrode 6. Instead of using the anisotropic conductive adhesive 16, an isotropic conductive adhesive may be used for bonding the inner-surface electrodes 10c and 11c to the surface electrodes 5a and 5b, and an insulating adhesive may be used in the vicinity of the external electrode 6. The other end of each of the inner-surface electrodes 10c and 11c extending to the holding portions 10b and 11b is electrically connected to an external electrode 7, which is located on the other end surfaces of the supporting frames 10 and 11 and the end member 15. As the adhesive 17 used for bonding the end member 15 to the holding portions 10b and 11b, an anisotropic conductive adhesive is preferably used for convenience of the manufacturing process. However, an isotropic conductive adhesive or an insulating adhesive may also be used.

A connecting electrode 18 is formed preferably by evaporation or sputtering on a side surface in the free-end side of the sensing element 2. The connecting electrode 18 is provided for connecting the central electrode 3 and the surface electrodes 5a and 5b. Also, since the connecting electrode 18 is formed in the region of the electrode gap Lg of the sensing element 2, it is not connected to the interlayer electrodes 4a and 4b. By forming the connecting electrode 18 also on a side surface opposite to the surface viewed in FIGS. 1 and 2, redundant connection can be realized. In this preferred embodiment, the connecting electrode 18 is disposed on the side surfaces of the supporting frames 10 and 11 and the end member 15 as well as on the side surface of the sensing element 2. However, this is for convenience of the manufacturing process, and the connecting electrode 18 may not be formed on the side surfaces of the supporting frames 10 and 11 and the end member 15. In this preferred embodiment, the connecting electrode 18 is preferably provided on the side surface of the sensing element 2. Alternatively, the connecting electrode 18 may be provided on the end surface in the free-end side of the sensing element 2 so that the central electrode 3 is connected to the surface electrodes 5a and 5b.

By providing the connecting electrode 18, the central electrode 3 and the surface electrodes 5a and 5b are connected at the end of the sensing element 2, and these electrodes are connected to the external electrode 7 disposed on the end of the sensor 1A through the inner-surface electrodes 10c and 11c of the supporting frames 10 and 11. Accordingly, even if the connection path of one of the supporting frames 10 and 11 is interrupted, the other connecting path can be used so that a redundant connection can be realized. Of course, the inner-surface electrode may be provided on only one of the supporting frames.

Figure 3:
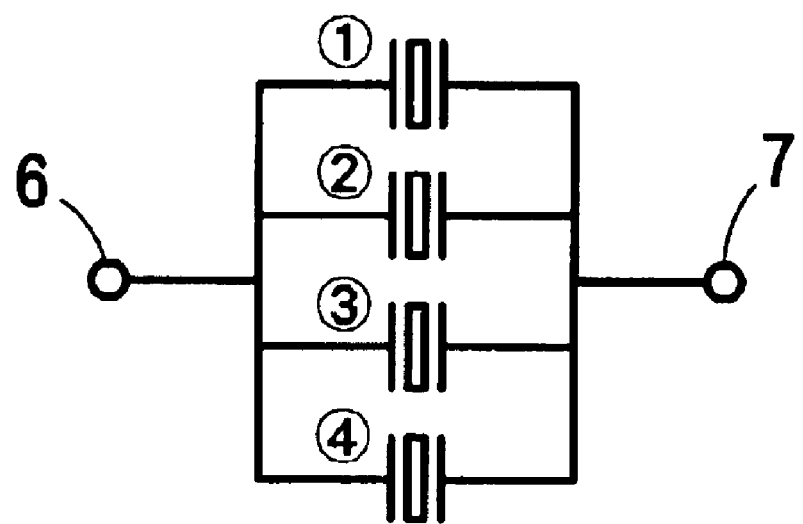
FIG. 3 is a circuit diagram of the acceleration sensor shown in FIG. 1.

By connecting the electrode of each layer in the above-described manner, cells (1) and (2) formed by the first layer 2a and the second layer 2b, which are in one side of the center in the thickness direction, are electrically connected in parallel, and cells (3) and (4) formed by the first layer 2c and the second layer 2d, which are in the other side, are electrically connected in parallel, as shown in FIG. 3. In this preferred embodiment, the interlayer electrodes 4a and 4b are connected through the external electrode 6, and the central electrode 3 and the surface electrodes 5a and 5b are connected through the inner-surface electrodes 10c and 11c and the external electrode 7. Accordingly, all the cells (1) to (4) are electrically connected in parallel.

Figure 2:
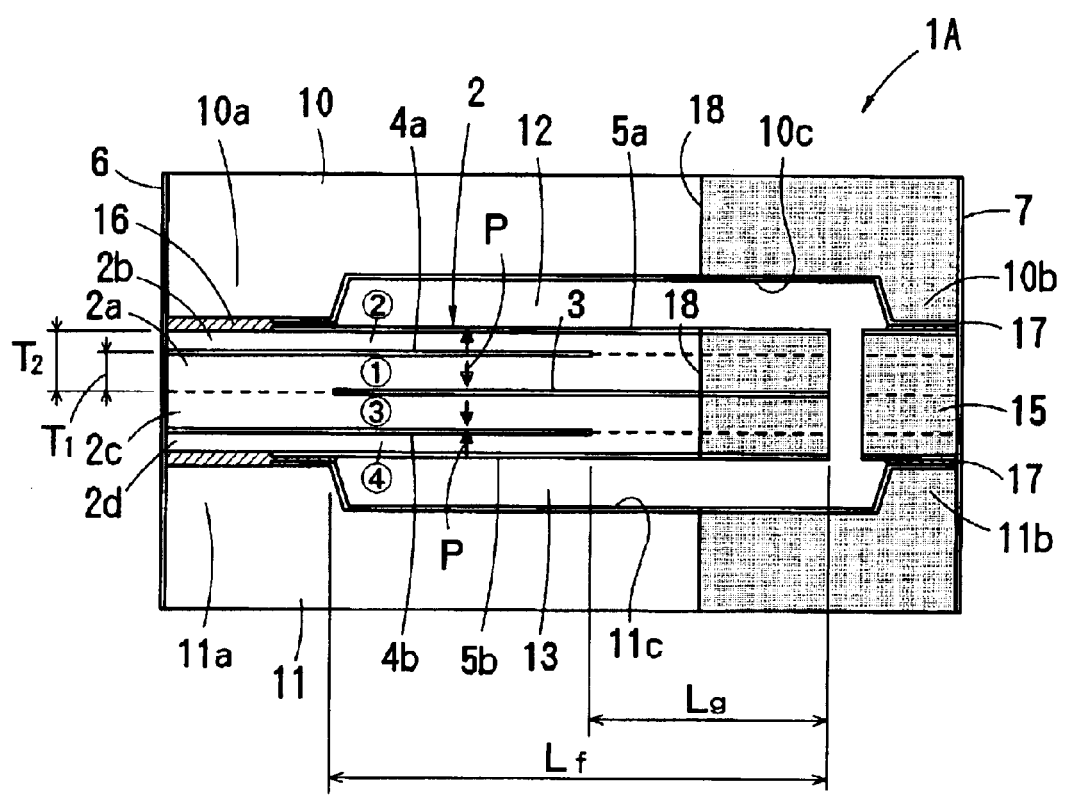
FIG. 2 is a front view of the acceleration sensor shown in FIG. 1.

As indicated by arrows P in FIGS. 1 and 2, the piezoelectric layers 2a to 2d are polarized in the thickness direction. The first layer 2a and the second layer 2b in one side of the center in the thickness direction are polarized in an outward direction, with the interlayer electrode 4a being the center. On the other hand, the first layer 2c and the second layer 2d in the other side are polarized in an inward direction, toward the interlayer 4b. Therefore, the first layers 2a and 2c, sandwiching the central electrode 3, are polarized in the same direction. The electrode gap portion is surrounded by the central electrode 3 and the surface electrodes 5a and 5b which are connected to each other, and the electrode gap portion does not have capacitance. Further, if charge or voltage is generated at this portion, they are canceled. Accordingly, the existence and direction of polarization at the electrode gap portion need not be considered.

Figure 4:
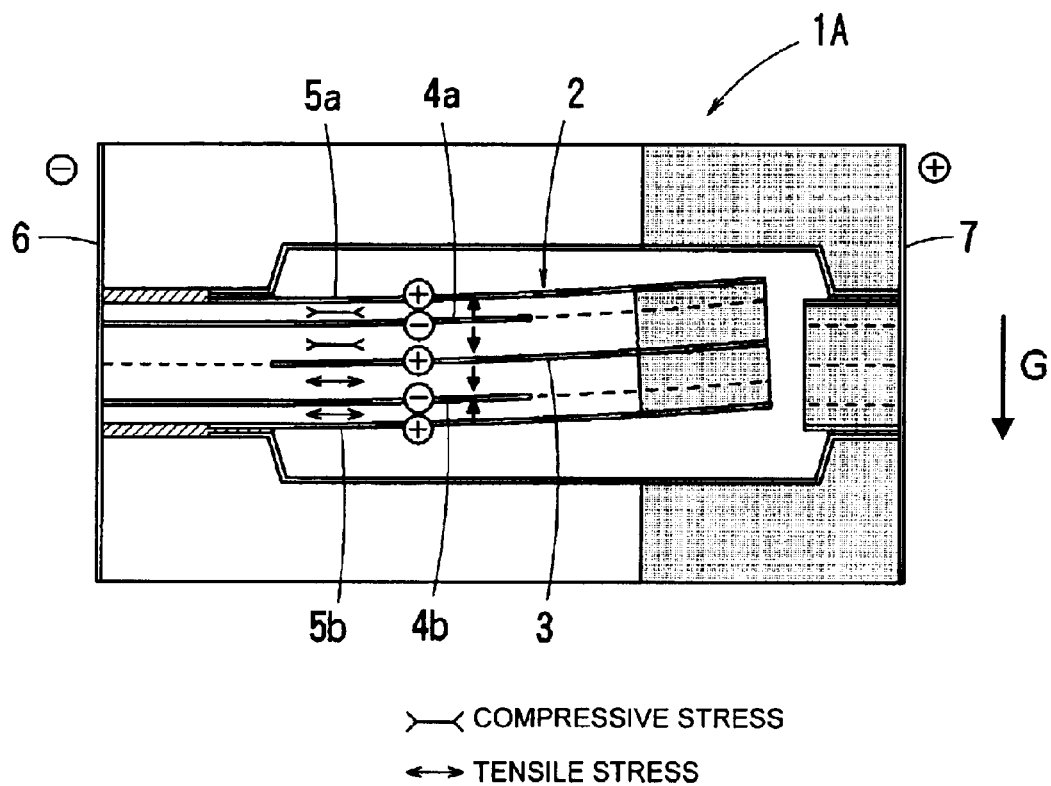
FIG. 4 illustrates an operation of the acceleration sensor shown in FIG. 1 when acceleration is applied.

FIG. 4 shows a condition where charge and voltage are generated by applying acceleration G to the acceleration sensor 1A, which has the above-described configuration. In FIG. 4, when acceleration G is applied in the direction indicated by the arrow, the sensing element 2 bends in the direction opposite to the accelerating direction by inertia, compressive stress is generated at the upper half of the sensing element 2, and tensile stress is generated at the lower half. Therefore, a positive charge is generated in the central electrode 3 and the surface electrodes 5a and 5b and a negative charge is generated in the interlayer electrodes 4a and 4b. As a result, a negative charge is output to the external electrode 6 which is in conduction with the interlayer electrodes 4a and 4b and a positive charge is output to the external electrode 7 which is in conduction with the central electrode 3 and the surface electrodes 5a and 5b.

Now, the reason why sensitivity can be increased by setting the ratio of the thickness $T_1$ of the first layer 2a (2c) to the total thickness $T_2$ of the first layer 2a (2c) and the second layer 2b (2d) to about 62% to about 76%, will be described with reference to FIGS. 5A and 5B.

Figure 5A:
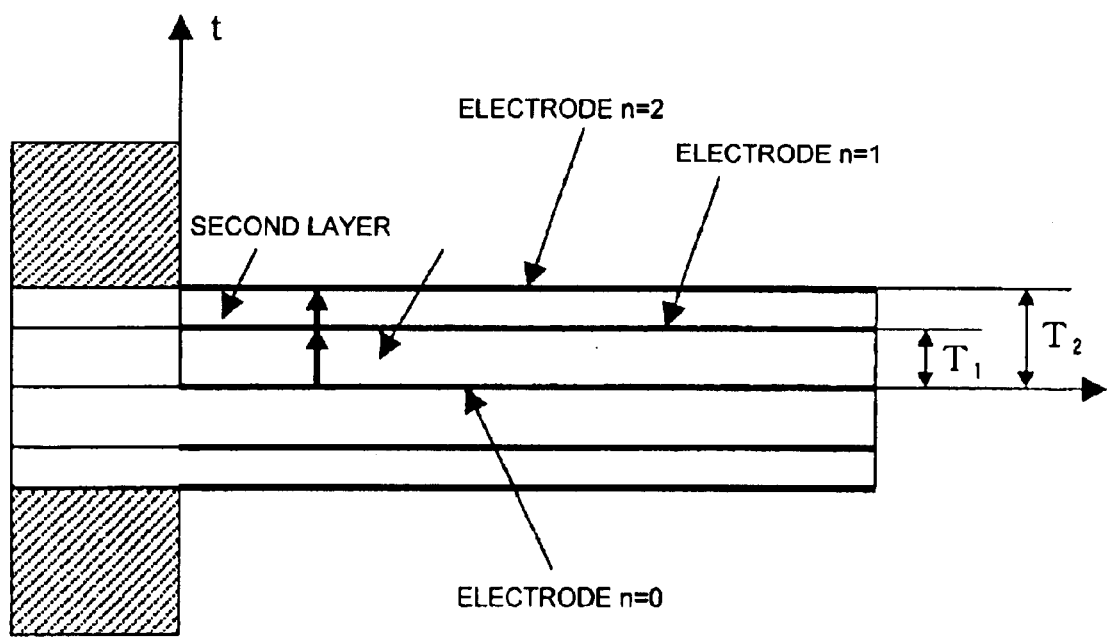

As shown in FIG. 5A, when the four-layered sensing element which is supported at one end is bended due to acceleration G, the inner stress of the piezoelectric layers is larger toward the outer surfaces, with the center in the thickness direction (neutral surface) being the origin point. For clarity, respective adjoining electrodes are electrically connected in the layers, as shown in FIG. 5B. Also, the polarization direction is only one in one side of the neutral surface. The stress is symmetric with respect to the neutral surface, and thus only one side is used for description. Accordingly, charge generated in each layer does not flow out to another layer, and thus, charge generated by acceleration can be maintained. In order to form an actual sensor, the electrodes should be connected in the direction in which charge and voltage are not canceled, as shown in FIGS. 1 and 2, for example.

A charge density D generated by stress at a distance t from the neutral surface can be represented by equation (1).

$$D = agt \tag{1}$$

Herein, "a" represents a constant including a piezoelectric constant and a construction parameter, "g" represents applied acceleration, and the unit of D is coulomb/m$^2$. Also, a potential V generated at a distance t in the thickness direction by this charge can be represented by equation (2), if the neutral surface is regarded as the origin point.

$$V = \int D/\epsilon \cdot dt = \tfrac{1}{2} \cdot a/\epsilon \cdot gt^2 \tag{2}$$

Herein, $\epsilon$ represents the permittivity. Therefore, potential $V_2$ at the surface electrode n=2 in FIG. 5A can be represented by the following equation based on t=$T_2$.

$$V_2 = \tfrac{1}{2} \cdot a/\epsilon \cdot gT_2^2 \tag{3}$$

The potential generated between a lower electrode n=0 and an upper electrode n=1 of the first layer is represented by $\Delta V_1$, and the potential generated between a lower electrode n=1 and an upper electrode n=2 of the second layer is represented by $\Delta V_2$. When these two layers, in which potential is generated, are electrically connected in parallel, and when the potential of the two layers is different from each other, charge generated by acceleration is flown from a high-potential layer to a low-potential layer, until the potential in both layers becomes equal to each other. Accordingly, energy loss is caused inside the sensor, and thus generated energy, which is the product of the voltage sensitivity and the charge sensitivity, relatively decreases. In order to minimize the energy loss, the potential generated at each layer should be made to be equal. That is, a maximum energy can be generated when an equation: $\Delta V_1 = \Delta V_2 = \Delta V$ is satisfied. In this case, the potential of both layers is represented by the following equation based on equation (3).

$$\Delta V = V_2/N = \tfrac{1}{2} \cdot a/\epsilon \cdot gT_2^2/N \tag{4}$$

Herein, N is the number of layers at one side. If the two layers are formed in each side, with the neutral surface being the axis of symmetry, as shown in FIG. 5A, N=2. Also, potential Vn generated in the electrode of nth layer can be represented by the following equation, in which the neutral surface is regarded as the origin point and equation (4) is used.

$$Vn = n \cdot \Delta V = \tfrac{1}{2} \cdot a/\epsilon \cdot gT_2^2 \cdot n/N \tag{5}$$

That is, equation (5) represents the potential with which the potential of each layer becomes equal so that energy loss can be prevented.

On the other hand, Vn is a potential at the thickness t and can be obtained from equation (2). Therefore, in a sensor structure whose one side includes n layers, a distance t to the electrode of nth layer for making the potential $\Delta V$ in each layer to be equal can be obtained by finding t, which can be obtained by solving simultaneous equations (2) and (5).

$$t = T\sqrt{(n/N)} \tag{6}$$

Herein, T is the total thickness of one side.

Table 2 shows the results of equation (6). In table 2, both results of N=2 and N=3 are shown.

TABLE 2

| Distance between neutral surface and electrode n | Number of layers in one side | |
|---|---|---|
| | N = 2 | N = 3 |
| Electrode n = 1 | 1/√2 · T = 0.71T | 1/√3 · T = 0.58T |
| Electrode n = 2 | T | √2/3 = 0.82T |
| Electrode n = 3 | — | T |

Figure 5B:
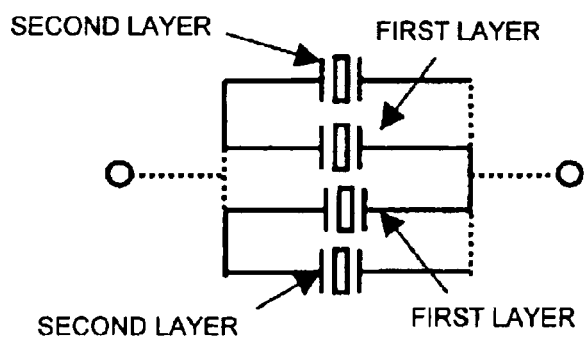

As is clear from table 2, in the configuration shown in FIGS. 5A and 5B, in which two layers are provided in one side (N=2), the position of the electrode n=1 for obtaining maximum energy is at about 71% of the total thickness of one side. Likewise, although not shown, in the configuration in which three layers are provided in one side (N=3), the position of the upper electrode n=1 of the first layer is at about 58% of T and the position of the upper electrode n=2 of the second layer is at about 82%.

Figures 6A, 6B:
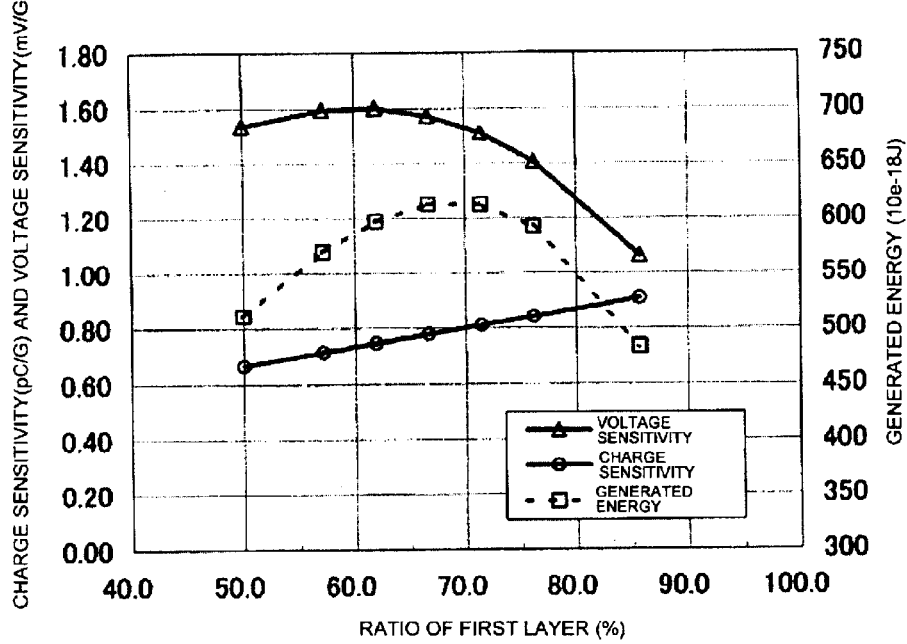

FIGS. 6A and 6B show the results obtained by calculating the voltage sensitivity and charge sensitivity by using a finite element method, by changing the ratio of the first layer. An example of the shape of the sensor is as follows, with the configuration shown in FIG. 2: free length Lf=about 3.0 mm; element thickness (2T)=about 0.42 mm, the ratio of electrode gap (Lg/Lf)=about 50%. With this condition, the charge sensitivity, voltage sensitivity, and generated energy when the ratio of the first layer ($T_1/T_2$) is changed in the range of about 50% to about 86% have been obtained. As is clear from FIGS. 6A and 6B, the charge sensitivity increases as the ratio of the first layer increases. On the other hand, the voltage sensitivity reaches maximum when the ratio of the first layer is about 60%, and decreases as the ratio of the first layer increases. Therefore, maximum energy is generated when the ratio of the first layer is about 70%, and the amount of energy at this time is larger by about 20% than in the known art, in which the ratio of the first layer is about 50%. The generated energy is maximum when the ratio of the first layer is about 70%, but the energy increases about 16% or more when the ratio of the first layer is about 62% to about 76%. That is, a sufficient effect can be obtained in this range.

Further, the generated energy is substantially maximum when the ratio of the first layer is about 66.7%. That is, when the thickness of the first layer is twice the thickness of the second layer (for example, the thickness of the first layer is about 140 μm and the thickness of the second layer is about 70 μm), maximum energy can be obtained. This means that a highly sensitive sensing element can be realized by laminating three ceramic sheets in one side, each sheet having a thickness of about 70 μm, a first layer including two of the ceramic sheets, and a second layer including one ceramic sheet. With this method, since the thicknesses of all the ceramic sheets are preferably the same, the sensing element can be efficiently manufactured.

Figure 7:
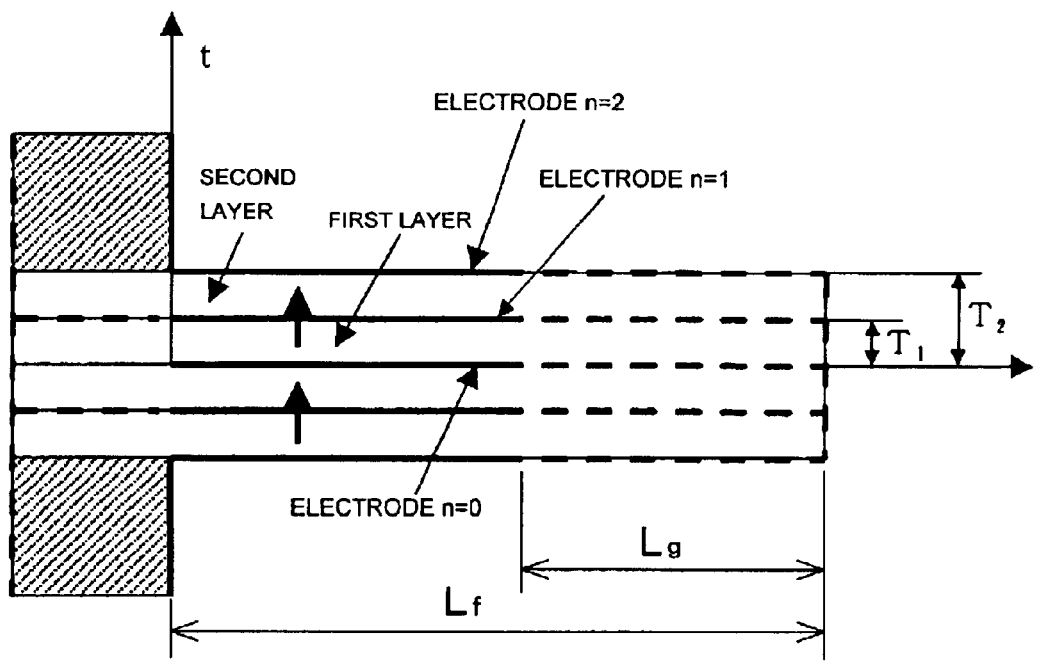
FIG. 7 shows the configuration of the four-layered acceleration sensor for illustrating effects of generated energy according to the ratio of an electrode gap.

Next, the reason why sensitivity increases by setting the length of the electrode gap Lg to about 20% to about 70% of the free length Lf will be described with reference to FIG. 7. FIG. 7 shows a four-layered sensing element which is supported at one end. The sensing element includes a central electrode (n=0), interlayer electrodes (n=1), and surface electrodes (n=2), and one end of each of the electrodes is positioned at a predetermined distance (length of electrode gap Lg) from the free end of the sensing element. Herein, the polarizing directions of the layers are the same for clarity.

Figures 8A, 8B:
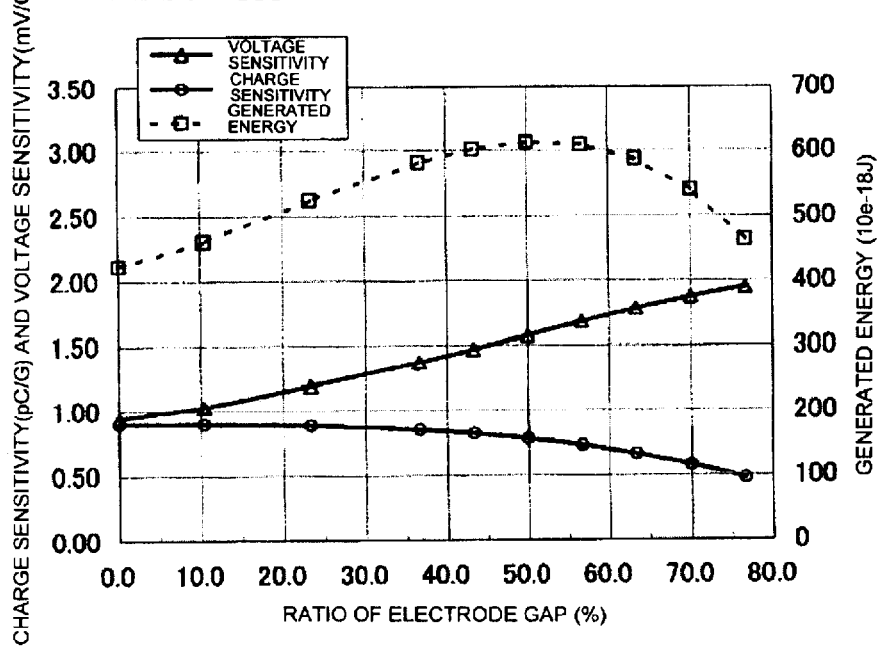

In this sensing element, the stress distributed when acceleration is applied thereto is larger in the vicinity of the supporting portion and becomes lower toward the free end. Therefore, the amount of charge generated at the free end is relatively small and the potential is low. In this state, charge moves from the vicinity of the supporting portion where the potential is high to the free-end side where the potential is low, and thus energy loss is caused. Therefore, larger amount of energy can be obtained by providing an electrode gap in a predetermined range of the free end portion. FIGS. 8A and 8B show the voltage sensitivity, charge sensitivity, and generated energy under the following condition: free length Lf=about 3.0 mm, thickness of element (2T)=about 0.42 mm, thickness of first layer=about 0.14 mm, thickness of second layer=about 0.07 mm, and the ratio of the electrode gap (Lg/Lf) is changed in the configuration shown in FIG. 2.

As is clear from FIGS. 8A and 8B, by increasing the ratio of the electrode gap, the area of the electrode is reduced and thus the charge sensitivity decreases, compared to the known art in which the ratio of electrode gap is 0%, that is, the electrode gap is not provided. On the other hand, the voltage sensitivity increases because of the reduced effect in the free-end side where potential is low. As a result, maximum energy is generated when the ratio of the electrode gap is about 50%. In this case, the amount of energy is larger by about 45% than in a case where the electrode gap is not provided. The amount of generated energy can be increased by about 20% when the ratio of the electrode gap is about 20% to about 70%, where sufficient desirable effects can be obtained.

The followings can be understood from FIGS. 6A, 6B, 8A, and 8B. In the four-layered acceleration sensor having a one-end-supported construction, the amount of generated energy in the present invention is larger by about 39% or more compared to the known art. That is, the electrode gap is not provided and each of the four layers has the same thickness in the known art, whereas the ratio of the first layer ($T_1/T_2$) is about 62% to about 76% and the ratio of the electrode gap (Lg/Lf) is about 20% to about 70% as shown in FIGS. 1 and 2 in the present invention. In particular, when the ratio of the first layer ($T_1/T_2$) is about 66.7% to about 71.4% and the ratio of the electrode gap (Lg/Lf) is about 45% to about 55%, the ratio of an increase in the generated energy is about 70% or more. Accordingly, the amount of generated energy can be significantly increased without changing the free length and thickness of the sensing element, and thus a highly sensitive acceleration sensor can be realized.

Figure 9:
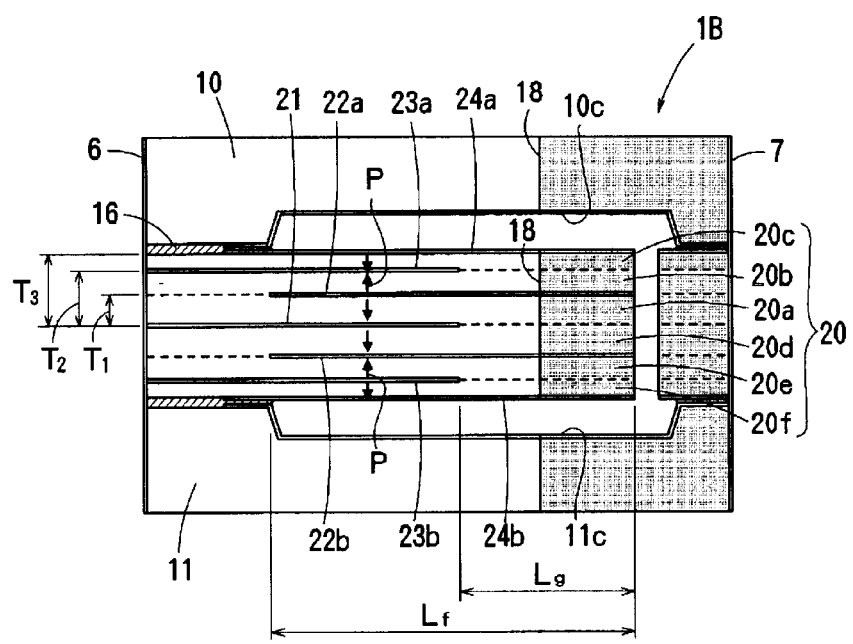
FIG. 9 is a front view of an acceleration sensor according to a second preferred embodiment of the present invention.

FIG. 9 shows an acceleration sensor 1B according to a second preferred embodiment of the present invention. In this preferred embodiment, elements which are the same as those in the first preferred embodiment are denoted by the same reference numerals, and the corresponding description will be omitted.

The acceleration sensor 1B of this preferred embodiment includes a sensing element 20 of a one-end-supported structure. That is, the sensing element 20 is supported at one end by supporting frames 10 and 11. The sensing element 20 is preferably made by laminating six piezoelectric layers 20a to 20f, each layer being a thin strip-shaped and including piezoelectric ceramic, and by baking the layers. In the sensing element 20, first layers 20a and 20d are laminated with the center in the thickness direction therebetween, second layers 20b and 20e sandwich the first layers 20a and 20d, and third layers 20c and 20f are formed on the outer side. Further, a central electrode 21 is provided at the center in the thickness direction of the sensing element 20, interlayer electrodes 22a and 22b are provided between the first layer 20a and the second layer 20b and between the first layer 20d and the second layer 20e, respectively, interlayer electrodes 23a and 23b are provided between the second layer 20b and the third layer 20c and between the second layer 20e and the third layer 20f, respectively, and surface electrodes 24a and 24b are provided on the outer surfaces of the third layers 20c and 20f. The six piezoelectric layers 20a to 20f sandwiched by the electrodes 21, 22a, 22b, 23a, 23b, 24a, and 24b, form six cells. In the three layers in each side of the central electrode 21, each of adjoining piezoelectric layers is polarized in the opposite direction in the thickness direction, and the first layers 20a and 20d sandwiching the central electrode 21 are polarized in the same direction.

The symmetrically-positioned first layers 20a and 20d, second layers 20b and 20e, and third layers 20c and 20f, have the same thickness, respectively. Further, the ratio of the thickness $T_1$ of each first layer to the total thickness $T_3$ of each combination of first to third layers is about 51% to about 62%, and the ratio of the total thickness $T_2$ of each combination of first and second layers to the total thickness $T_3$ of each combination of first to third layers is about 72% to about 87%. More preferably, $T_1/T_3 \approx 0.58$ and $T_2/T_3 \approx 0.82$. The reason for setting the thickness to this value has been described above with reference to table 2.

The central electrode 21 and the interlayer electrodes 23a and 23b preferably have the same shape and extend from one end of the sensing element 20 provided with an external electrode 6 to an intermediate portion of the sensing element 20. That is, an electrode gap Lg is provided in the free-end side of the sensing element 20, and the ratio of the electrode gap Lg to the free length Lf is about 20% to about 70%.

Figure 10:
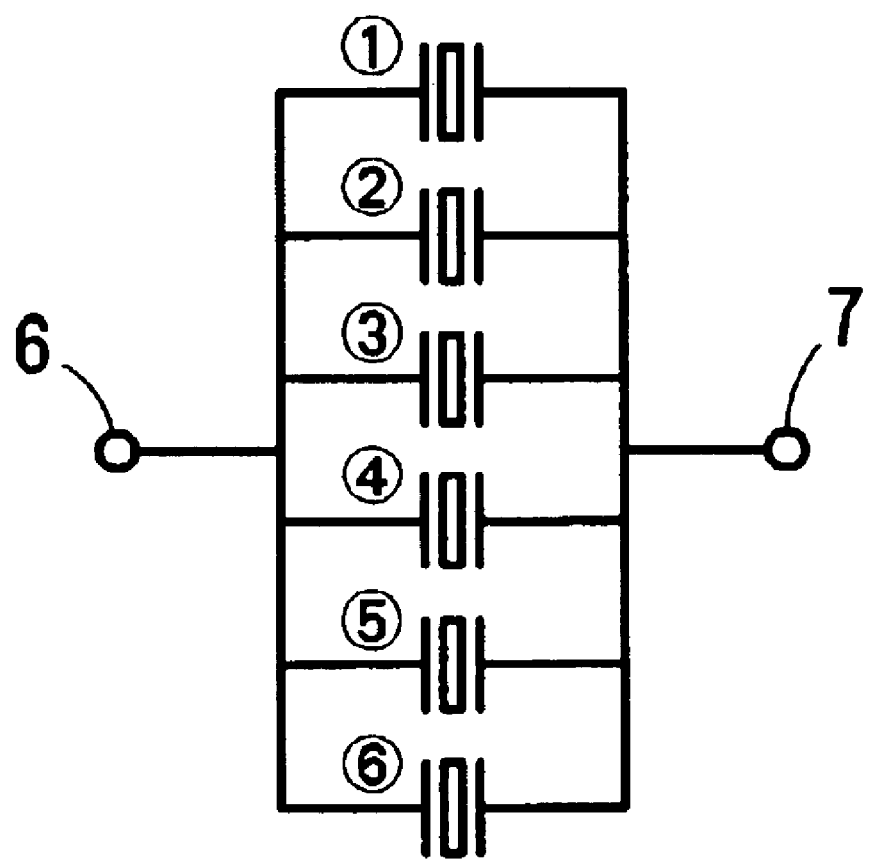
FIG. 10 is a circuit diagram of the acceleration sensor shown in FIG. 9.

Also, the interlayer electrodes 22a and 22b have almost the same shape as that of the surface electrodes 24a and 24b, and the interlayer electrodes 22a and 22b and the surface electrodes 24a and 24b extend from the vicinity of the bonded portion of the sensing element 20 to the free end thereof. Further, the surface electrodes 24a and 24b are in conduction with inner-surface electrodes 10c and 11c of the supporting frames 10 and 11. A connecting electrode 18 is arranged on a side surface in the free-end side of the sensing element 20, so that the interlayer electrodes 22a and 22b are connected to the surface electrodes 24a and 24b through the connecting electrode 18. In this case, too, the interlayer electrodes 22a and 22b may be connected to the surface electrodes 24a and 24b by providing the connecting electrode on the end surface in the free-end side of the sensing element 20. By connecting the electrode of each layer in the above-described manner, the six cells (1)–(6) including the layers are electrically connected in parallel, as shown in FIG. 10.

As in the first preferred embodiment, in the acceleration sensor 1B of this preferred embodiment, the amount of generated energy can be significantly increased compared to the known six-layered acceleration sensor, by setting the ratio of the thickness $T_1$ of each first layer to about 51% to about 62%, the ratio of the total thickness $T_2$ of each combination of first and second layers to about 72% to about 87%, and the ratio of the electrode gap (Lg/Lf) to about 20% to about 70%. That is, the amount of generated energy can be significantly increased without changing the free length and thickness of the sensing element, and thus a highly sensitive acceleration sensor can be realized.

Figure 11:
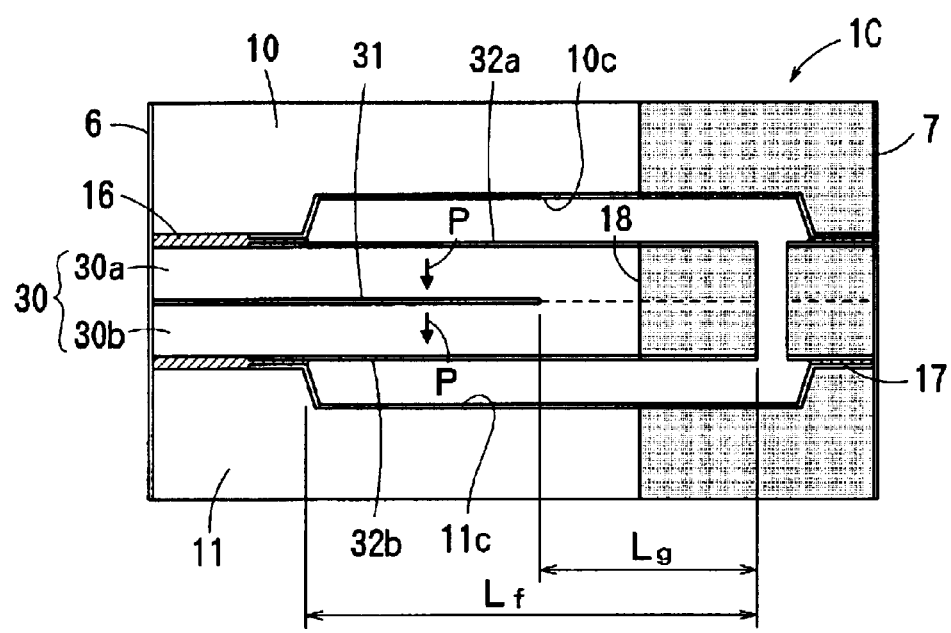
FIG. 11 is a front view of an acceleration sensor according to a third preferred embodiment of the present invention.

FIG. 11 shows an acceleration sensor 1C according to a third preferred embodiment of the present invention. In this preferred embodiment, elements which are the same as those in the first preferred embodiment are denoted by the same reference numerals, and the corresponding description will be omitted.

The acceleration sensor 1C of this preferred embodiment includes a sensing element 30 of a one-end-supported structure. That is, the sensing element 30 is supported at one end by supporting frames 10 and 11. The sensing element 30 is made by laminating two piezoelectric layers 30a and 30b, each layer being thin strip-shaped and including piezoelectric ceramic, and by baking the layers. A central electrode 31 is provided at the center in the thickness direction of the sensing element 30, and surface electrodes 32a and 32b are provided on the outer surfaces of the layers 30a and 30b, respectively. The two piezoelectric layers 30a and 30b are polarized in the same direction in the thickness direction.

The central electrode 31 extends from one end of the sensing element 30 provided with an external electrode 6 to an intermediate portion of the sensing element 30. That is, en electrode gap Lg is provided in the free-end side of the sensing element 30, and the ratio of the electrode gap Lg to the free length Lf is about 20% to about 70%.

The surface electrodes 32a and 32b extend from the vicinity of the bonded portion of the sensing element 30 to the free end thereof. Further, the surface electrodes 32a and 32b are in conduction with inner-surface electrodes 10c and 11c of the supporting frames 10 and 11. Also, a connecting electrode 18 is arranged on a side surface in the free-end side of the sensing element 30, so that the surface electrodes 32a and 32b are connected through the connecting electrode 18. However, the surface electrodes 32a and 32b are not in conduction with the central electrode 31. In this case, too, two cells including the layers are electrically connected in parallel.

In this acceleration sensor 1C, the amount of generated energy can be increased compared to the known two-layered acceleration sensor, by setting the ratio of the electrode gap (Lg/Lf) to about 20% to about 70%.

Figures 12A, 12B:
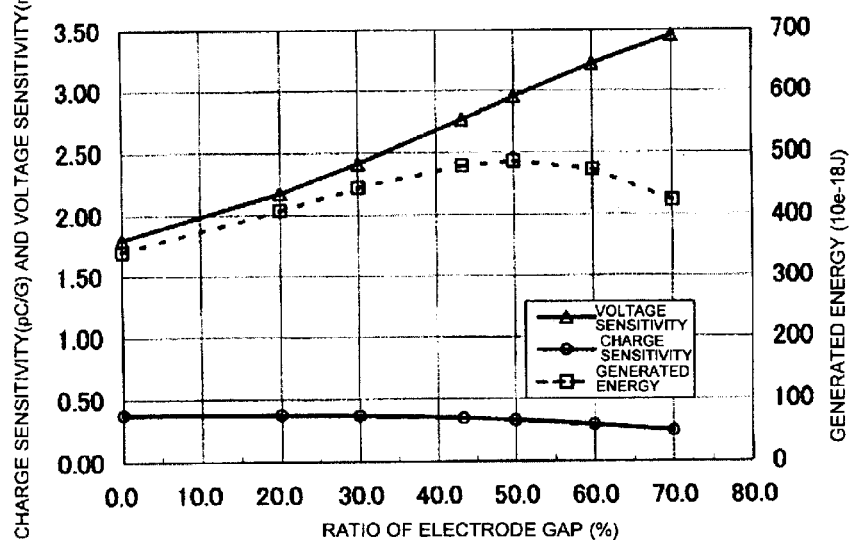

FIGS. 12A and 12B show the voltage sensitivity, charge sensitivity, and generated energy when the ratio of the electrode gap is changed in the acceleration sensor 1C having the configuration shown in FIG. 11. In this case, too, generated energy is maximum when the ratio of the electrode gap is about 50%, and the amount of energy is larger by about 43% compared to the case where the electrode gap is not formed. Also, the amount of generated energy can be increased about 20% or more when the ratio of the electrode gap is about 20% to about 70%, and thus, sufficient desirable effects can be obtained.

In FIG. 11, the polarization direction of the two layers is the same and the two layers are electrically connected in parallel. The above-described effect can be obtained also in the sensing element having the configuration disclosed in Japanese Unexamined Patent Application Publication No. 9-26433. That is, the polarization direction of the two layers may be opposite to each other and the two cells may be electrically connected in series. The effect of increase in generated energy obtained when the ratio of the electrode gap is about 20% to about 70% can be obtained by adopting a one-end-supported construction, in which the sensing element is supported at one end thereof. In this case, the number of layers, the polarization direction, and electrical connecting method are not considered.

Figure 13:
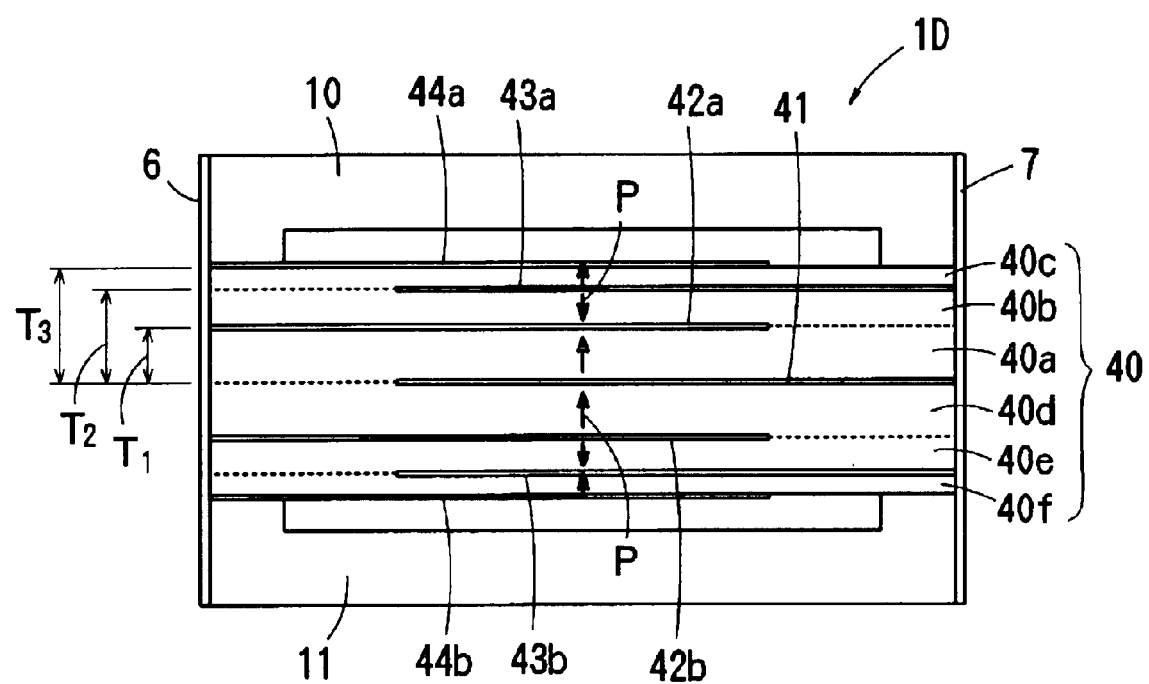
FIG. 13 is a front view of an acceleration sensor according to a fourth preferred embodiment of the present invention.

FIG. 13 shows an acceleration sensor 1D according to a fourth preferred embodiment of the present invention. In this preferred embodiment, elements which are the same as those in the first preferred embodiment are denoted by the same reference numerals, and the corresponding description will be omitted.

The acceleration sensor 1D has a similar configuration as that of the six-layered sensor disclosed in Japanese Unexamined Patent Application Publication No. 10-62445, except that the thickness of the piezoelectric layer is changed. That is, the acceleration sensor 1D includes a sensing element 40 having both ends thereof supported by supporting frames 10 and 11. The sensing element 40 is preferably made by laminating six piezoelectric layers 40a to 40f, each layer being thin strip-shaped and including piezoelectric ceramic, and by baking the layers. The sensing element 40 includes first layers 40a and 40d sandwiching the center in the thickness direction, second layers 40b and 40e sandwiching the first layers 40a and 40d, and third layers 40c and 40f on the outer side. Also, a central electrode 41 is provided at the center in the thickness direction of the sensing element 40, interlayer electrodes 42a and 42b are provided between the first layer 40a and the second layer 40b and between the first layer 40d and the second layer 40e, respectively, interlayer electrodes 43a and 43b are provided between the second layer 40b and the third layer 40c and between the second layer 40e and the third layer 40f, respectively, and surface electrodes 44a and 44b are provided on the outer surfaces of the third layers 40c and 40f. The six piezoelectric layers 40a to 40f sandwiched by the above-described electrodes 41, 42a, 42b, 43a, 43b, 44a, and 44b form six cells. In the three layers in each side of the central electrode 41, each of adjoining piezoelectric layers is polarized in the opposite direction in the thickness direction, and the first layers 40a and 40d sandwiching the central electrode 41 are polarized in the same direction.

The symmetrically-positioned first layers 40a and 40d, second layers 40b and 40e, and third layers 40c and 40f, have the same thickness, respectively. Further, the ratio of the thickness $T_1$ of each first layer to the total thickness $T_3$ of each combination of first to third layers is about 51% to about 62%, and the ratio of the total thickness $T_2$ of each combination of first and second layers to the total thickness $T_3$ of each combination of first to third layers is about 72% to about 87%. More preferably, $T_1/T_3 \approx 0.58$ and $T_2/T_3 \approx 0.82$. The reason for setting the thickness to this value has been described above with reference to table 2.

The central electrode 41 and the interlayer electrodes 43a and 43b preferably have the same shape and extend from one end of the sensing element 40 provided with an external electrode 7 to an intermediate portion of the sensing element 40. The interlayer electrodes 42a and 42b have the same shape as that of the surface electrodes 44a and 44b. The interlayer electrodes 42a and 42b and the surface electrodes 44a and 44b extend from the other end of the sensing element 40 provided with an external electrode 6 to an intermediate portion of the sensing element 40. By connecting the electrode of each layer in the above-described manner, the six cells including the layers are electrically connected in parallel, as in FIG. 10.

In the acceleration sensor 1D of this preferred embodiment, the amount of generated energy can be significantly increased compared to the known six-layered acceleration sensor (see Japanese Unexamined Patent Application Publication No. 10-62445, for example), by setting the ratio of the thickness $T_1$ of each first layer to the total thickness $T_3$ to about 51% to about 62%, and the ratio of the total thickness $T_2$ of each combination of first and second layers to about 72% to about 87%. That is, the amount of generated energy can be significantly increased without changing the free length and thickness of the sensing element, and thus a highly sensitive acceleration sensor can be realized.

The present invention is not limited to the above-described preferred embodiments. The sensing element may not have a one-end-supported construction, and may have a both-ends-supported construction or a center-supported construction. That is, the four-layered sensing element of the first preferred embodiment may be supported at both ends thereof. Also, the electrode gap Lg is provided for the interlayer electrodes 4a and 4b in the first preferred embodiment, for the central electrode 21 and the interlayer electrodes 23a and 23b in the second preferred embodiment, and for the central electrode 31 in the third preferred embodiment. However, the present invention is not limited to this configuration. That is, a region where charge is not generated due to stress when acceleration is applied, or a region where generated charge is not output therefrom, should be provided in the free-end side of the sensing element.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. An acceleration sensor comprising:
   a sensing element; and
   a supporting member for supporting the sensing element at one end, both ends, or a central portion in a longitudinal direction of the sensing element;
   wherein the sensing element includes at least four laminated piezoelectric layers, each of the at least four laminated piezoelectric layers including piezoelectric ceramic,
   the at least four piezoelectric layers include a pair of first layers positioned at a center in a thickness direction of the sensing element and a pair of second layers sandwiching the pair of first layers,
   electrodes are provided at the center in the thickness direction of the sensing element, between the pair of first layers and the pair of second layers, and on outer surfaces of the pair of second layers,
   cells formed by the first and second layers located on the same side with respect to the center in the thickness direction are electrically connected in parallel,
   the pair of first layers have substantially the same thickness and the pair of second layers have substantially the same thickness, and
   a ratio of the thickness of each first layer to the total thickness of each first and second layer is about 62% to about 76%.

2. The acceleration sensor according to claim 1, wherein each of the piezoelectric layers includes one or more ceramic sheets having the same thickness, and the number of ceramic sheets included in each first layer is twice the number of ceramic sheets included in each second layer.

3. The acceleration sensor according to claim 1, wherein the supporting member includes a pair of supporting frames each having a substantially U-shaped cross-section.

4. The acceleration sensor according to claim 1, wherein one end of the sensing element is supported by the supporting member.

5. The acceleration sensor according to claim 1, wherein each of the at least four laminated piezoelectric layers is strip-shaped.

6. The acceleration sensor according to claim 1, wherein an electrode-free portion extending from a free end of the sensing element to another end of each of the electrodes defines an electrode gap.

7. The acceleration sensor according to claim 6, wherein a ratio of the length of the electrode gap to the free length Lf of the sensing element is about 20% to about 70%.

8. An acceleration sensor comprising:
   a sensing element; and
   a supporting member for supporting the sensing element at one end, both ends, or a central portion in a longitudinal direction thereof,
   wherein the sensing element includes at least six laminated piezoelectric layers, each of the at least six laminated piezoelectric layers including piezoelectric ceramic,
   the at least six piezoelectric layers include a pair of first layers positioned at a center in a thickness direction of the sensing element, a pair of second layers sandwiching the pair of first layers, and a pair of third layers located on an outer side of the second layers;
   electrodes are provided at the center in the thickness direction of the sensing element, between the pair of first layers and the pair of second layers, between the pair of second layers and the pair of third layers, and on outer surfaces of the pair of third layers,
   cells formed by the first, second, and third layers located on the same side with respect to the center in the thickness direction are electrically connected in parallel,
   the pair of first layers have substantially the same thickness, the pair of second layers have the same thickness, and the pair of third layers have substantially the same thickness,
   a ratio of the thickness of each first layer to the total thickness of each first, second, and third layer is about 51% to about 62%, and
   a ratio of the total thickness of each first and second layer to the total thickness of each first, second, and third layer is about 72% to about 87%.

9. The acceleration sensor according to claim 8, wherein each of the piezoelectric layers includes one or more ceramic sheets having the same thickness, and the number of ceramic sheets included in each first layer is twice the number of ceramic sheets included in each second layer.

10. The acceleration sensor according to claim 8, wherein the supporting member includes a pair of supporting frames each having a substantially U-shaped cross-section.

11. The acceleration sensor according to claim 8, wherein one end of the sensing element is supported by the supporting member.

12. The acceleration sensor according to claim 8, wherein each of the at least six laminated piezoelectric layers is strip-shaped.

13. The acceleration sensor according to claim 8, wherein an electrode-free portion extending from a free end of the sensing element to another end of each of the electrodes defines an electrode gap.

14. The acceleration sensor according to claim 13, wherein a ratio of the length of the electrode gap to the free length Lf of the sensing element is about 20% to about 70%.

15. An acceleration sensor comprising:
    a sensing element; and a supporting member for supporting the sensing element at one end in a longitudinal direction thereof, wherein the sensing element includes at least two laminated piezoelectric layers, each of the at least two laminated piezoelectric layers including piezoelectric ceramic, electrodes are provided between the piezoelectric layers and on outer surfaces of the piezoelectric layers, an electrode gap is provided in a free-end side of the sensing element, the electrode gap being a region where at least one of the electrodes facing each other with the piezoelectric layers therebetween is not provided; and a ratio of the length of the electrode gap to the free length of the sensing element is about 20% to about 70%.

16. The acceleration sensor according to claim 15, wherein a connecting electrode for connecting the electrodes which extend to a free end of the sensing element is provided on a side surface in the free-end side of the sensing element in which the electrode gap is provided.

17. The acceleration sensor according to claim 15, wherein the sensing element includes at least four laminated piezoelectric layers, each of the at least four laminated piezoelectric layers including piezoelectric ceramic, the at least four laminated piezoelectric layers include a pair of first layers located at a center in a thickness direction of the sensing element and a pair of second layers sandwiching the pair of first layers, electrodes are provided at the center in the thickness direction of the sensing element, between the pair of first layers and the pair of second layers, and on outer surfaces of the pair of second layers, cells formed by the first and second layers located on the same side with respect to the center in the thickness direction are electrically connected in parallel, the pair of first layers have substantially the same thickness and the pair of second layers have the same thickness, and a ratio of the thickness of each first layer to the total thickness of each first and second layer is about 62% to about 76%.

18. The acceleration sensor according to claim 17, wherein one end of each of the electrodes between the pair of first layers and the pair of second layers extends to an end surface of the sensing element supported by the supporting members, and an other end of each of the electrodes is positioned at a predetermined distance from a free end of the sensing element so as to define the electrode gap, the electrodes at the center in the thickness direction and the electrodes on the outer surfaces of the pair of second layers extend from the vicinity of a proximal end of the sensing element supported by the supporting members to the free end of the sensing element, and a connecting electrode for connecting the electrodes at the center in the thickness direction and the electrodes on the outer surfaces of the pair of second layers is provided on a side surface in the free-end side of the sensing element, wherein the connecting electrode is not connected to the electrodes between the pair of first layers and the pair of second layers.

* * * * *